(12) United States Patent
Sakai

(10) Patent No.: US 9,151,449 B2
(45) Date of Patent: Oct. 6, 2015

(54) VESSEL ATTACHING/REMOVING DEVICE FOR CONDITIONING APPARATUS

(75) Inventor: Hiraku Sakai, Tokyo (JP)

(73) Assignee: Koganei Corporation, Tokyo (JP)

( * ) Notice: Subject to any disclaimer, the term of this patent is extended or adjusted under 35 U.S.C. 154(b) by 31 days.

(21) Appl. No.: 14/115,463

(22) PCT Filed: Dec. 22, 2011

(86) PCT No.: PCT/JP2011/079913
§ 371 (c)(1),
(2), (4) Date: Nov. 15, 2013

(87) PCT Pub. No.: WO2012/153441
PCT Pub. Date: Nov. 15, 2012

(65) Prior Publication Data
US 2014/0069521 A1    Mar. 13, 2014

(30) Foreign Application Priority Data
May 6, 2011   (JP) .................................. 2011-103456

(51) Int. Cl.
*B01D 46/00*    (2006.01)
*F17C 13/00*    (2006.01)
(Continued)

(52) U.S. Cl.
CPC ............ *F17C 13/002* (2013.01); *B01D 35/306* (2013.01); *B01D 46/001* (2013.01);
(Continued)

(58) Field of Classification Search
CPC .... B01D 29/25; B01D 35/153; B01D 29/902; B01D 35/306; B01D 35/31; B01D 2201/4023; B01D 2201/4046; B01D 2201/4076

USPC ............................. 55/504, 508, 449, 394, 396
See application file for complete search history.

(56) References Cited

U.S. PATENT DOCUMENTS

2009/0229231 A1*  9/2009  Treyz ............................. 55/504
2013/0139481 A1*  6/2013  Sakai et al. ..................... 55/396
(Continued)

FOREIGN PATENT DOCUMENTS

JP          57156110         10/1982
JP          63115418 U        7/1988
(Continued)

OTHER PUBLICATIONS

International search report for PCT/JP2011/079913 dated Jan. 19, 2012.

*Primary Examiner* — Duane Smith
*Assistant Examiner* — Minh-Chau Pham
(74) *Attorney, Agent, or Firm* — McCormick, Paulding & Huber LLP

(57) ABSTRACT

The attaching/removing workability of the collecting vessel of a conditioning apparatus with respect to a port block is increased. A primary-side port and a secondary-side port are formed in a port block 13, and a female screw part 27 that is screwed to a male screw part 23 is provided to the collecting vessel 24 that is mounted to the port block 13. An annular lock member 31 is mounted to the opening end of the collecting vessel 24 so as to be movable in the axial direction. A tongue piece 38 that presses the annular lock member 31 towards the outside in the axial direction of the collecting vessel 24 is provided to the inside of the annular lock member 31. A movable-side engagement part 41 that engages a fixed-side engagement part 42 of the port block 13 when the collecting vessel 24 is rotated to a position of fastening completion is provided to the annular lock member 31.

9 Claims, 9 Drawing Sheets

(51) Int. Cl.
  *B01D 35/30* (2006.01)
  *F16J 15/08* (2006.01)

(52) U.S. Cl.
  CPC ....... *F16J15/0887* (2013.01); *B01D 2201/302* (2013.01); *B01D 2201/305* (2013.01); *B01D 2265/028* (2013.01); *Y10T 137/598* (2015.04)

(56) References Cited

U.S. PATENT DOCUMENTS

2014/0075898 A1* 3/2014 Sakai .............................. 55/461
2014/0083064 A1* 3/2014 Sakai .............................. 55/449
2014/0174045 A1* 6/2014 Sakai .............................. 55/394

FOREIGN PATENT DOCUMENTS

| | | |
|---|---|---|
| JP | 6431253 U | 2/1989 |
| JP | 295520 U | 7/1990 |
| JP | 2102098 U | 8/1990 |
| JP | 7328364 A | 12/1995 |
| JP | 861538 A | 3/1996 |

* cited by examiner

VESSEL ATTACHING/REMOVING DEVICE FOR CONDITIONING APPARATUS

TECHNICAL FIELD

The present invention relates to a vessel attaching/removing device for a conditioning apparatus, with which a collecting vessel of a conditioning apparatus such as an air filter used in a pneumatic circuit is mounted on a port block in an attachable/detachable manner.

BACKGROUND ART

Compressed air is supplied to a pneumatic equipment such as a pneumatic cylinder from an air pressure source through a pneumatic line such as a pipe or a hose. A pneumatic circuit is formed by connecting the air pressure source and the pneumatic equipment with the pneumatic line. In order to remove droplets and dusts in the air supplied from the air pressure source to the pneumatic equipment, a filter is provided in the pneumatic circuit. When a lubricant is to be constantly supplied to the pneumatic equipment, a lubricator to inject the lubricant in the form of a mist into the compressed air is provided in the pneumatic circuit.

The filter and the lubricator are referred to as a conditioning apparatus or an FRL including a regulator which adjusts a pressure of the compressed air supplied to the pneumatic equipment. The filter has a filter bowl, that is, a vessel to capture and contain moisture, dusts, and oil components in the air supplied from the air pressure source. In the filter described in Patent Document 1, in order to remove droplets and foreign objects in the air flowing in from a primary-side port and to supply the purified air to a secondary-side port, a filter element is mounted in a collecting vessel. At a bottom part of the collecting vessel of this filter, a drain discharge mechanism for discharging the fluid accumulated inside is provided.

The lubricator has a vessel to contain a lubricant to be injected into the compressed air, and the lubricant contained in the vessel is supplied in the form of a mist to the air flowing into the secondary-side port. As described above, the vessel in which the conditioning apparatus is housed is attached to a port block having a primary-side port and a secondary-side port formed therein. Since the filter and the lubricator each have a port block, a port block which is shared including a regulator, that is, a port unit is described in Patent Document 2.

PRIOR ART DOCUMENTS

Patent Documents

Japanese Patent Application Laid-Open Publication No. H7-328364

Japanese Patent Application Laid-Open Publication No. H8-61538

SUMMARY OF THE INVENTION

Problems to be Solved by the Invention

In a conditioning apparatus such as a filter and a lubricator, conventionally, a collecting vessel is mounted on a port block in an attachable/detachable manner, and a screw structure and a lock button are provided in the collecting vessel so as to prevent the collecting vessel from coming off from the port block.

FIG. 9 is a perspective view showing a conventional filter, in which an annular part 62 is provided in a port block 61 and a collecting vessel 63 is screwed to the inside of the annular part 62. When a lock button 64 provided on the collecting vessel 63 is pressed, the lock of the collecting vessel 63 to the port block 61 is released, and by rotating the collecting vessel 63 to the left to loosen the screw, the collecting vessel 63 can be detached from the port block 61. An engagement part corresponding to the lock button 64 is provided at four locations at intervals of 90 degrees in a circumferential direction on the annular part 62 of the port block 61. Therefore, when the collecting vessel 63 is attached to the port block 61, the lock button 64 is engaged with any of the four engagement parts.

A conditioning apparatus such as a filter is mostly installed on a wall surface by an attachment bracket fixed to a port block. Consequently, when the collecting vessel is attached from a lower side to the port block installed on the wall surface, if the collecting vessel is inserted into the port block and rotated to the right to lock it, the lock button sometimes comes around on a wall surface side. If the collecting vessel is mounted on the port block in this manner, when removing the collecting vessel, the collecting vessel cannot be easily removed from the port block because the lock button cannot be seen from the outside and further an operator cannot make a hand reach the lock button located in a narrow space between the conditioning apparatus and the wall surface.

Therefore, in a conventional conditioning apparatus, it is necessary to confirm the position of the lock button of the collecting vessel so as to guess the position of the lock button after the collecting vessel is rotated, and an attaching operation of the collecting vessel to the port block cannot be promptly carried out. On the other hand, depending on the position of the lock button of the attached collecting vessel, an operation of removing the collecting vessel from the port block cannot be easily carried out. As described above, the conventional conditioning apparatus has a problem that the attaching operation and removing operation of the collecting vessel with respect to the port block, that is, the attaching/removing operation cannot be easily carried out.

An object of the present invention is to enhance attaching/removing workability of a collecting vessel of a conditioning apparatus with respect to a port block.

Means for Solving the Problems

A vessel attaching/removing device for a conditioning apparatus according to the present invention includes: a port block in which a primary-side port to which compressed air is supplied and a secondary-side port which discharges compressed air are formed; a collecting vessel having a cylindrical shape in which a female screw part to be screwed to a male screw part provided in the port block is provided inside an opening end part; an annular lock member mounted outside the opening end part of the collecting vessel so as to be movable in an axial direction of the collecting vessel; a biasing member which is provided inside the annular lock member and presses the annular lock member in the axial direction toward the port block; and a movable-side engagement part which is provided on the annular lock member and engages with a fixed-side engagement part of the port block side when the collecting vessel is rotated to a fastening completion position between the female screw part and the male screw part.

In the vessel attaching/removing device for a conditioning apparatus according to the present invention, the movable-side engagement part is formed from a protruding part which protrudes in an axial direction from an end surface of the annular lock member, and the fixed-side engagement part with which the movable-side engagement part engages is formed in the port block. In the vessel attaching/removing device for a conditioning apparatus according to the present invention, the movable-side engagement part is formed from a cutout portion which is cut out from an end surface of the annular lock member in the axial direction, and the fixed-side engagement part with which the movable-side engagement part engages is formed in the port block. In the vessel attaching/removing device for a conditioning apparatus according to the present invention, two said movable-side engagement parts are provided on the annular lock member so as to be shifted by 180 degrees in a circumferential direction, and the fixed-side engagement parts with which the movable-side engagement parts engage are formed in the port block. In the vessel attaching/removing device for a conditioning apparatus according to the present invention, the biasing member is made up of: a tongue piece which elastically deforms so that an inclined tip provided on an inner circumferential surface of the annular lock member so as to be inclined in a radially inward direction toward the port block is displaced in a radial direction; and an inclined surface which is provided on an outer circumferential surface of the collecting vessel so as to be inclined in a radially outward direction toward a bottom part of the collecting vessel and with which the tongue piece is to be in contact. In the vessel attaching/removing device for a conditioning apparatus according to the present invention, the male screw part and the female screw part are multiple thread screws. In the vessel attaching/removing device for a conditioning apparatus according to the present invention, a filter element to remove foreign objects such as droplets contained in the air flowing from the primary-side port to the secondary-side port is mounted on the port block, thereby purifying the air which flows out of the secondary-side port. In the vessel attaching/removing device for a conditioning apparatus according to the present invention further includes an adaptor, and the adapter is provided with: a cylinder body in which an additional female screw part to be screwed to the male screw part is provided on one end part and an additional male screw part to which the female screw part is screwed is provided on the other end part; an additional annular lock member which is mounted outside one end part of the cylinder body so as to be movable in an axial direction; an additional biasing member which is provided inside the additional annular lock member and presses the additional annular lock member in an axially outward direction of the cylinder body; and a fixed-side engagement part which is formed on a flange provided in the cylinder body, and with which the movable-side engagement part engages, and the collecting vessel is connected to the port block by the adapter.

Effects of the Invention

According to the present invention, on the opening end part of the collecting vessel, the annular lock member is provided so as to be movable in the axial direction of the collecting vessel, and the movable engagement part which engages with the port block is provided on this annular lock member. Since the annular lock member is continuous over the whole circumference in a ring-like shape, no matter which position the annular lock member takes in a rotation direction with respect to the port block, the collecting vessel can be removed from the port block by moving the annular lock member in a longitudinal direction and rotating the collecting vessel. On the other hand, when mounting the collecting vessel on the port block, by rotating the collecting vessel up to the fastening completion position, the movable engagement part of the annular lock member engages with the port block, and the collecting vessel can be fastened to the port block.

BRIEF DESCRIPTIONS OF THE DRAWINGS

DESCRIPTIONS OF THE PREFERRED EMBODIMENTS

Hereinafter, embodiments of the present invention will be described in detail based on drawings. A filter $10a$ shown in FIGS. 1 to 5 has a metal port block 13 in which a primary-side port 11 and a secondary-side port 12 are formed. A primary-side pneumatic line made up of a pipe (not shown) or the like is connected to the primary-side port 11, and compressed air from a compressed air source is supplied to the primary-side port 11 via this pneumatic line. A secondary-side pneumatic line made up of a pipe (not shown) or the like is connected to the secondary-side port 12, and the air which is purified by removing droplets or the like is introduced from the secondary-side port to an external pneumatic equipment via the pneumatic line. The primary-side port 11 and the secondary-side port 12 are opened in the side surfaces on the opposite sides of the port block 13, respectively. The side surface of the port block 13 in which each port is opened is made to be almost flat, and the port block 13 has a cube like shape as a whole as shown in FIGS. 1A, 1B, 2A and 2B.

Figure 5A:
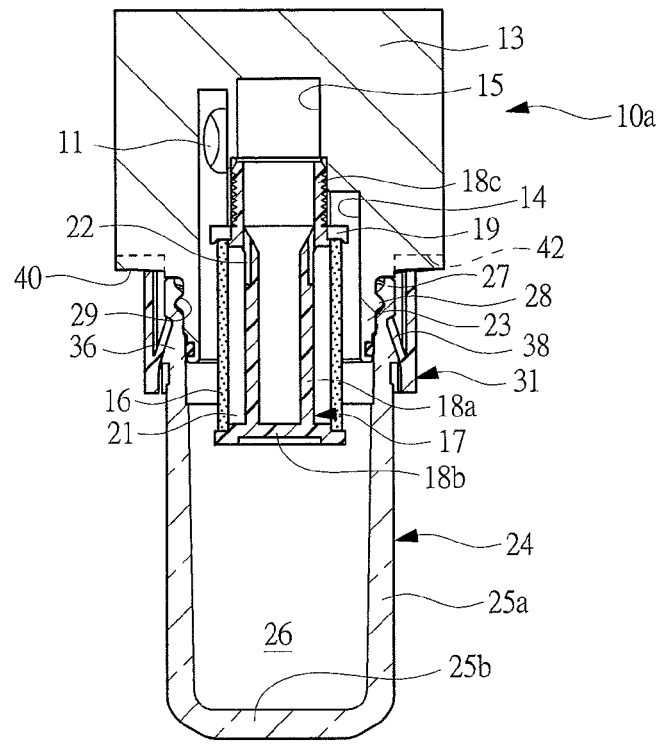
FIG. 5A is a cross-sectional view taken along the line 5A-5A in FIG. 1B.
Figure 5B:
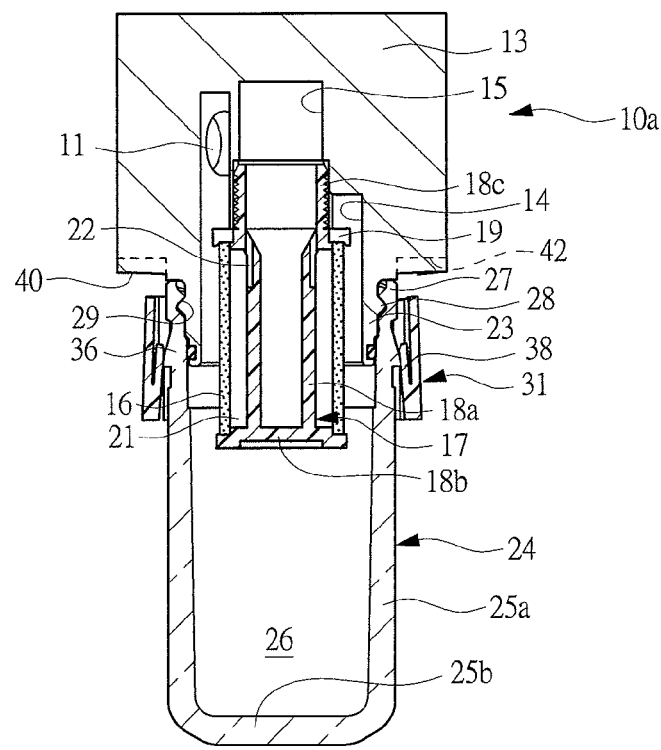
FIG. 5B is a cross-sectional view taken along the line 5B-5B in FIG. 2B.

In the port block 13, a housing hole 14 is formed as shown in FIG. 5A and FIG. 5B, and the primary-side port 11 communicates with an inner circumferential surface of the housing hole 14. In the central part of the port block 13, a mounting hole 15 which communicates with the secondary-side port 12 is formed. A filter element 16 having a cylindrical shape is attached to a holder 17, and the filter element 16 is attached to the inside of the port block 13 by this holder 17. This holder 17 includes: a cylindrical part $18a$ having a diameter smaller than that of the filter element 16; an end plate part $18b$ provided at a lower end part thereof; and an attaching part $18c$ provided at an upper end part of the cylindrical part $18a$. In the attaching part $18c$ of the holder 17, a male screw part is formed, and a female screw part to which this male screw part is screwed is formed in the mounting hole 15.

The filter element 16 is attached to the holder 17, and is fixed to the holder 17 in a sandwiched state between a stopper ring 19 which functions as a louver and the end plate part 18b. Between the filter element 16 and the cylindrical part 18a, a communicating clearance 21 is formed, and this communicating clearance 21 communicates with the secondary-side port 12 via a communicating hole 22 formed in the cylindrical part 18a and the mounting hole 15. Therefore, droplets and foreign objects such as particles contained in the compressed air supplied to the primary-side port 11 from an air pressure supply source (not shown) are removed by the filter element 16, and the purified air is supplied from the secondary-side port 12 to the outside.

Figure 3:
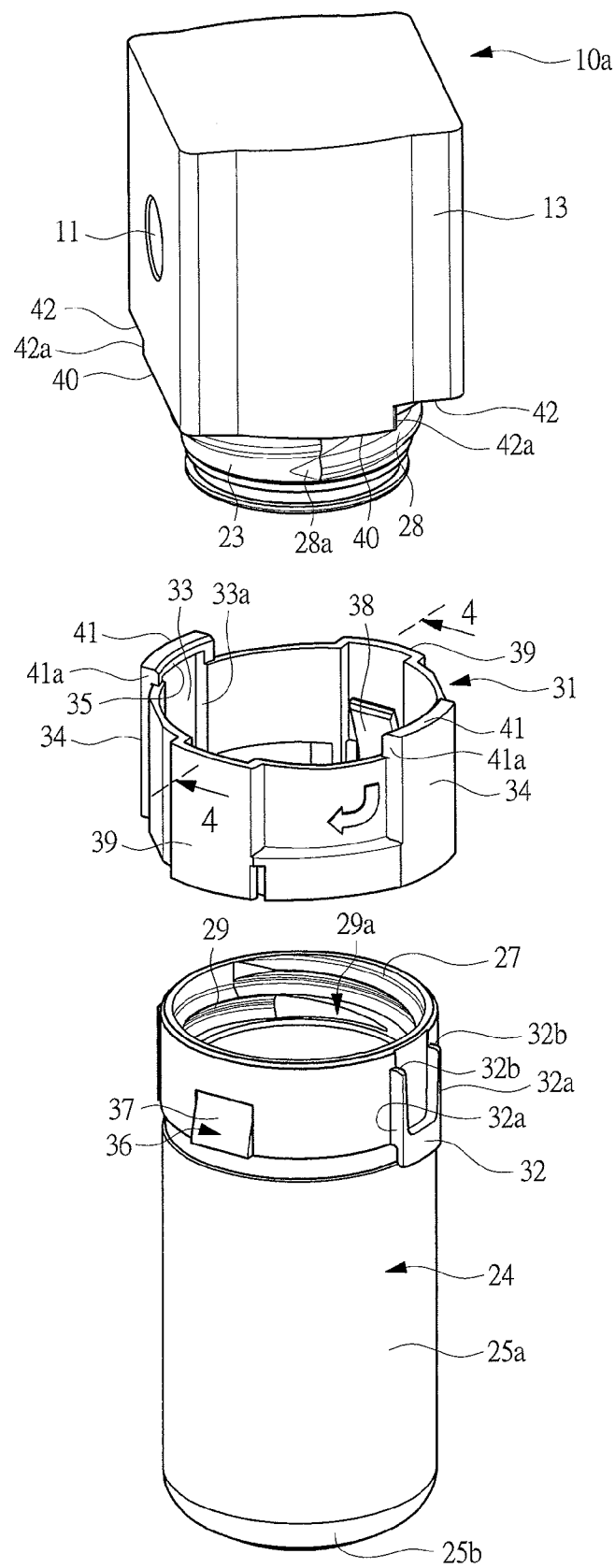
FIG. 3 is an exploded perspective view of the filter shown in FIG. 1 and FIG. 2.

In a lower end part of the port block 13, a male screw part 23 in a cylindrical shape is provided, and a collecting vessel 24 is mounted on the male screw part 23. The collecting vessel 24, also referred to as a filter bowl, has a cylindrical part 25a and a bottom wall part 25b integrated with the lower end part thereof, and is made of a transparent resin material. An inner part of the collecting vessel 24 functions as a reservoir 26. An upper end part of the collecting vessel 24 forms an opening part, and a female screw part 27 is formed in an inner surface of the opening end part. In the female screw part 27, a thread groove 29 to which a screw thread 28 provided in the male screw part 23 of the port block 13 is screwed is formed. As shown in FIG. 3, the screw thread 28 and the thread groove 29 are made to be double thread screws of right-handed screw having starting ends 28a and 29a shifted from each other by about 180 degrees in a circumferential direction, respectively, and a distance of movement in the axial direction at the time of rotating the collecting vessel 24, that is, a lead is twice the pitch of the screw thread 28. When the screw thread 28 and the thread groove 29 are made to be triple thread screws, the lead is three times the pitch of the screw thread 28. By making the screw thread 28 and the thread groove 29 as multiple thread screws such as the double thread screws or the triple thread screws instead of making them as single thread screws, the collecting vessel 24 can be attached to and removed from the port block 13 with a small rotation angle of the collecting vessel 24 while keeping a constant moving stroke of the collecting vessel 24.

On the outside of the opening end part of the collecting vessel 24, an annular lock member 31 made of resin is mounted so as to be movable in an axis direction, that is, a longitudinal direction of the collecting vessel 24. On an outer circumferential surface of the collecting vessel 24, two convex guide parts 32 are provided so as to be shifted by 180 degrees in a circumferential direction, and as shown in FIG. 3, concave guide parts 33 into which the convex guide parts 32 enter are formed on an inner circumferential surface of the annular lock member 31. Therefore, the annular lock member 31 is guided by the convex guide parts 32 entering into the concave guide parts 33 and moves in the longitudinal direction on the outside of the collecting vessel 24. In addition, a side wall 33a of the concave guide part 33 is made to be in contact with a side surface 32a of the convex guide part 32, and the rotation of the annular lock member 31 is prevented by these guide parts 32 and 33. An outer surface of the annular lock member 31 corresponding to the concave guide part 33 is made to be a protruding part 34 projected in a radially outward direction for making a resin thickness uniform. The concave guide part 33 is provided with a stopper 35 on which an end part 32b of the convex guide part 32 abuts, and this stopper 35 abutting on the end part 32b of the guide part 32 restricts the position of the annular lock member 31 in the direction toward the bottom wall part 25b of the collecting vessel 24.

Figure 4:
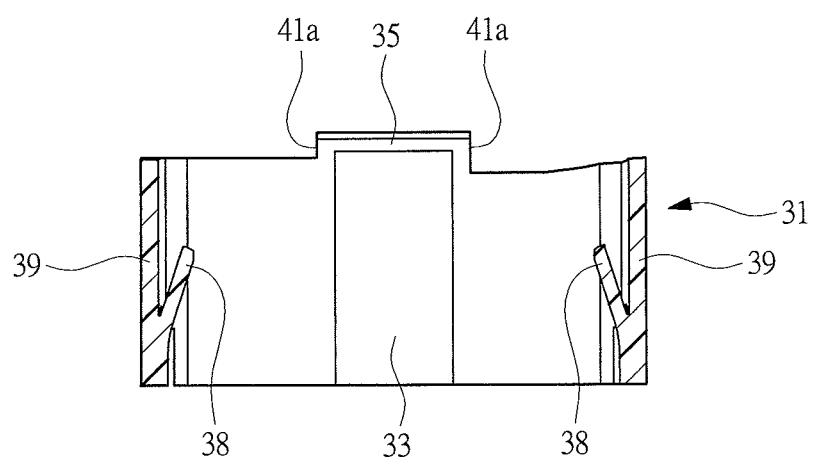
FIG. 4 is a cross-sectional view of the annular rock member taken along the line 4-4 in FIG. 3.

As shown in FIG. 3, on the outer circumferential surface of the collecting vessel 24, two inclined protrusions 36 are provided so as to be shifted by 90 degrees in a circumferential direction with respect to the convex guide parts 32. The inclined protrusion 36 has an inclined surface 37 which is inclined in a radially outward direction toward the bottom part of the collecting vessel 24. On the other hand, on the inner circumferential surface of the annular lock member 31, as shown in FIG. 4, tongue pieces 38 inclining in a radially inward direction toward the port block 13 and in contact with the inclined surfaces 37 are provided so as to project in an inward direction of the annular lock member 31. A part of the annular lock member 31 in which the tongue pieces 38 are provided has a concave shape, and the outer surface of the annular lock member 31 corresponding to this concave part is made to be a protruding part 39.

The tongue pieces 38 are formed integrally with the annular lock member 31 from an elastically deformable resin material, and elastically deforms so that a tip part thereof may be displaced in a radial direction. As shown in FIG. 4, the tips of the tongue pieces 38, that is, the inclined tips thereof are inclined in a radially inward direction. Since the annular lock member 31 which is integrated with the tongue pieces 38 is molded from an elastically deformable resin material, the inclined tips of the tongue pieces 38 can be elastically deformed by a force in a radially outward direction. Thus, when the annular lock member 31 is moved in a longitudinal direction toward the bottom part of the collecting vessel 24, as shown in FIG. 5B, the tip parts of the tongue pieces 38 slide along the inclined surface 37 and elastically deform so as to be displaced in a radially outward direction. By a repulsive force of the elastically-deformed tongue pieces 38, a pressing force in a direction toward the opening end part of the collecting vessel 24 is applied to the annular lock member 31. Therefore, as shown in FIG. 5B, when the annular lock member 31 is moved manually toward the bottom part of the collecting vessel 24 to a lock release position and then the hand is taken off the annular lock member 31, the annular lock member 31 returns to the original position automatically by the pressing force. In this manner, a pressing member which presses the annular lock member 31 toward the port block 13 is formed by the inclined protrusions 36 each having the inclined surface 37 and the tongue pieces 38. Although it is also possible to incorporate a spring member as a pressing member between the annular lock member 31 and the collecting vessel 24, a pressing force can be applied to the annular lock member 31 with a simple structure by using a part of the annular lock member 31 made of resin.

The protruding part 34, on the inner surface of which the concave guide part 33 is provided, is protruded in the axial direction compared with an end surface of the annular lock member 31 on the port block side, and the protruding end part functions as a movable-side engagement part 41. On the other hand, on a corner end surface of the port block 13, a recessed part with which the movable-side engagement part 41 engages is formed, and this recessed part functions as a fixed-side engagement part 42. Between an end abutment surface 40 of the port block 13 and the fixed-side engagement part 42, a stopper surface 42a is formed by a stepped part in the axial direction. On the other hand, both side surfaces of the movable-side engagement part 41 function as stopper surfaces 41a opposed to the stopper surface 42a.

Since the screw thread 28 and the thread groove 29 are the double thread screws of the right-handed screw, when the movable-side engagement part 41 is rotated to make an approximately half turn to the right in a state where the opening end part of the collecting vessel 24 is fitted to the male screw part 23 provided in the port block 13, it comes to the position where screw fastening between the male screw part 23 and the female screw part 27 is completed. In a rotation phase before the screw fastening is completed, the movable-side engagement part 41 abuts on the end abutment surface 40 of the port block 13. This end abutment surface 40 functions as a rotation allowing part which allows the rotation of the annular lock member 31, and the movable-side engagement part 41 abuts on the end abutment surface 40 and slides thereon. When the collecting vessel 24 is rotated up to the position at which the screw fastening is completed, the annular lock member 31 moves in a longitudinal direction by the elastic force of the tongue pieces 38, and the movable-side engagement part 41 engages with the fixed-side engagement part 42. More specifically, since the stopper surface 41a of the annular lock member 31 and the stopper surface 42a of the fixed-side engagement part 42 abut on each other, the annular lock member 31 takes a locked position where it cannot be rotated in a reverse direction. In this manner, the rotation of the collecting vessel 24 to the left is blocked, and the collecting vessel 24 is prevented from being loosened. At this time, the end surface of the annular lock member 31 on the port block 13 side abuts on the end abutment surface 40 of the port block 13.

Figure 1A:
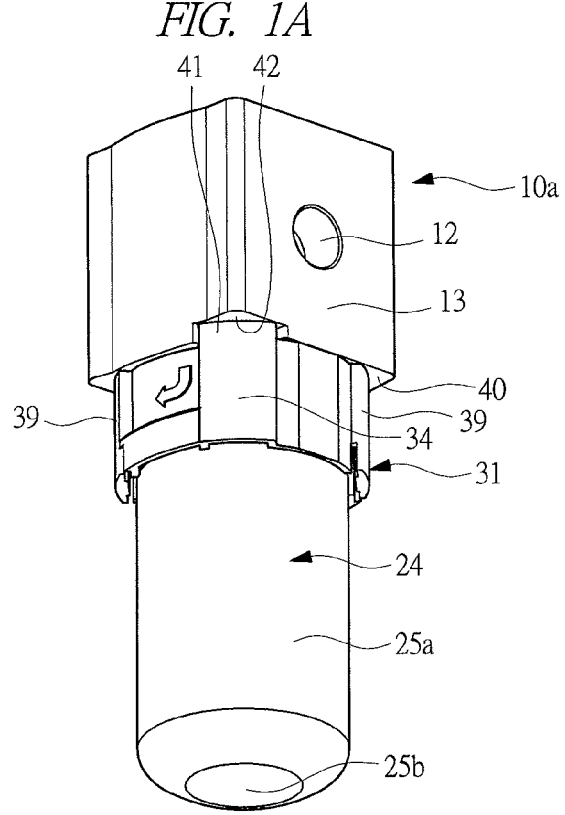
FIG. 1A is a bottom perspective view seen from the lower side of a filter according to an embodiment of the present invention in a state where an annular lock member takes a locked position.
Figure 1B:
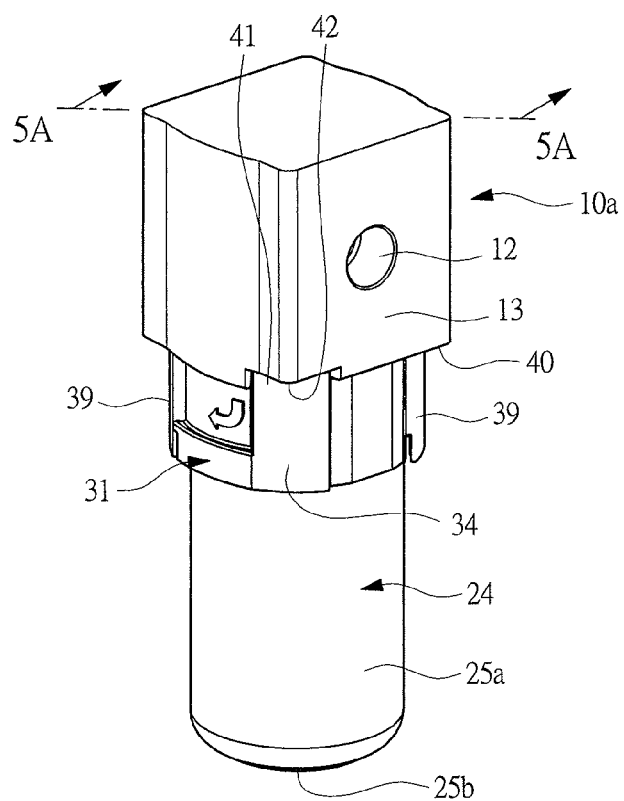
FIG. 1B is a top perspective view seen from the upper side of the filter of FIG. 1A.
Figure 2A:
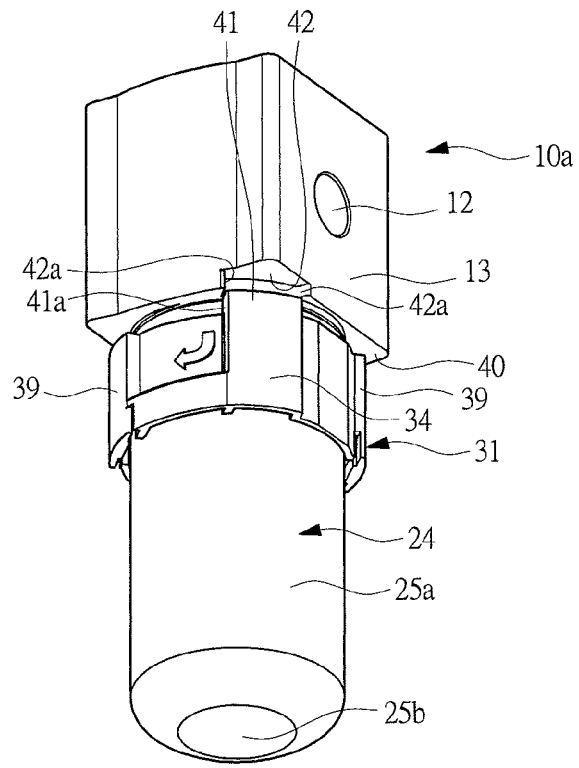
FIG. 2A is a bottom perspective view seen from the lower side of the filter in a state where the annular lock member takes a lock release position.
Figure 2B:
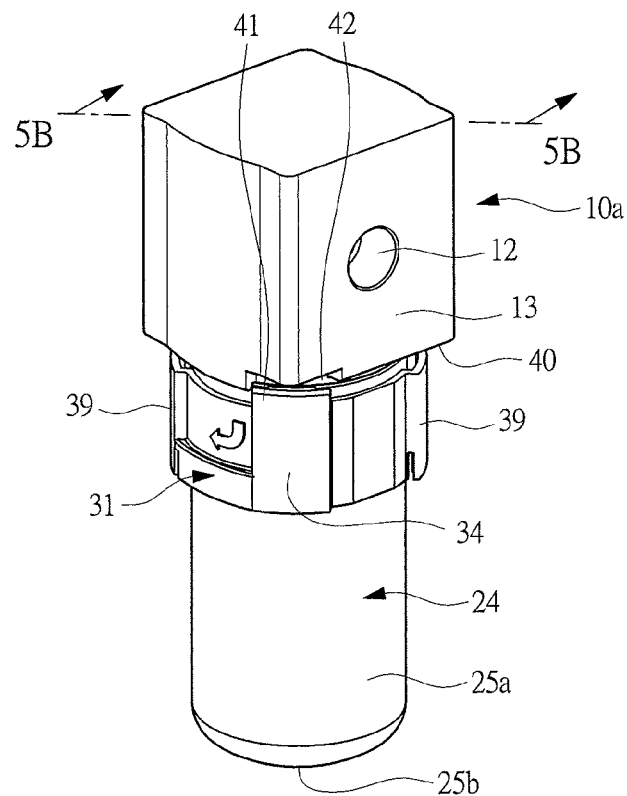
FIG. 2B is a top perspective view seen from the upper side of the filter of FIG. 2A.

On the other hand, when the collecting vessel 24 is to be removed from the port block 13, the annular lock member 31 is moved in the axial direction from the locked position shown in FIG. 1A and FIG. 1B to the lock release position shown in FIG. 2A and FIG. 2B, that is, the annular lock member 31 is moved toward the bottom part side of the collecting vessel 24, thereby releasing the engagement between the movable-side engagement part 41 and the fixed-side engagement part 42. More specifically, the stopper surface 41a of the movable-side engagement part 41 and the stopper surface 42a of the fixed-side engagement part 42 do not abut on each other. In this state, when the collecting vessel 24 is rotated to make a half turn to the left, the screw connection between the collecting vessel 24 and the port block 13 is released.

Since the annular lock member 31 is attached to the opening end part of the collecting vessel 24 having the cylindrical shape so as to cover the whole outer circumferential surface of the opening end part of the collecting vessel 24, no matter how the port block 13 is mounted on a mounting surface such as the wall surface, the whole annular lock member 31 is not covered by the wall surface or the like. Regardless of the posture of the filter 10a, the annular lock member 31 can be always observed from the outside. Therefore, by holding the annular lock member 31 and moving it to the bottom part side of the collecting vessel 24, the lock of the collecting vessel 24 by the annular lock member 31 is released. In this state, when the collecting vessel 24 is rotated to make a left turn by about 180 degrees, the collecting vessel 24 can be removed from the port block 13.

On the other hand, when the collecting vessel 24 is to be attached to the port block 13, after the opening end part of the collecting vessel 24 is fitted to the outside of the male screw part 23, the collecting vessel 24 is rotated to make a right turn by 180 degrees. Since the guide part 32 of the collecting vessel 24 and the guide part 33 of the annular lock member 31 restrict the mutual rotation, the annular lock member 31 rotates together with the collecting vessel 24. Accordingly, when the movable-side engagement part 41 of the annular lock member 31 comes to the position opposed to the fixed-side engagement part 42 of the port block 13, the movable-side engagement part 41 of the annular lock member 31 is engaged with the fixed-side engagement part 42 by an elastic force of the tongue pieces 38. As described above, the collecting vessel 24 can be attached to the port block 13 only by rotating the collecting vessel 24, and the collecting vessel 24 is automatically locked.

As mentioned above, it is possible to easily perform the attaching operation and removing operation of the collecting vessel 24 with respect to the port block 13.

Since the fixed-side engagement part 42 is formed in the end surface of the corner part of the port block 13 having an approximately cube like shape, as shown in FIGS. 1A, 1B, 2A and 2B, the protruding part 34 provided on the annular lock member 31 and protruding in the outward direction so as to correspond to the fixed-side engagement part 42 does not protrude in a radially outward direction from the side surface of the port block 13. Since the protruding parts 39 located at positions shifted by about 90 degrees in a circumferential direction with respect to the protruding part 34 correspond to the other two corner parts out of the four corner parts, each protruding part 39 does not protrude in a radially outward direction from the side surface of the port block 13. Therefore, when the filter 10a is used in a pneumatic circuit, it is possible to prevent an object from being in contact with each of the protruding parts 34 and 39.

In the filter 10a shown in FIGS. 1A to 5, when foreign objects such as dusts, moisture, oil components and fluid are contained in the air flowing from the primary-side port 11, the foreign objects are captured by the filter element 16 and fall down below. Thus, the purified air is introduced to the outside from the secondary-side port 12, and the foreign objects fallen in the collecting vessel 24 are accumulated in the reservoir 26 of the collecting vessel 24. Since the collecting vessel 24 is formed of transparent resin, the amount of fluid accumulated in the collecting vessel 24 can be observed from the outside, and when the fluid level becomes high, the collecting vessel 24 is removed to discard the fluid.

Figure 6:
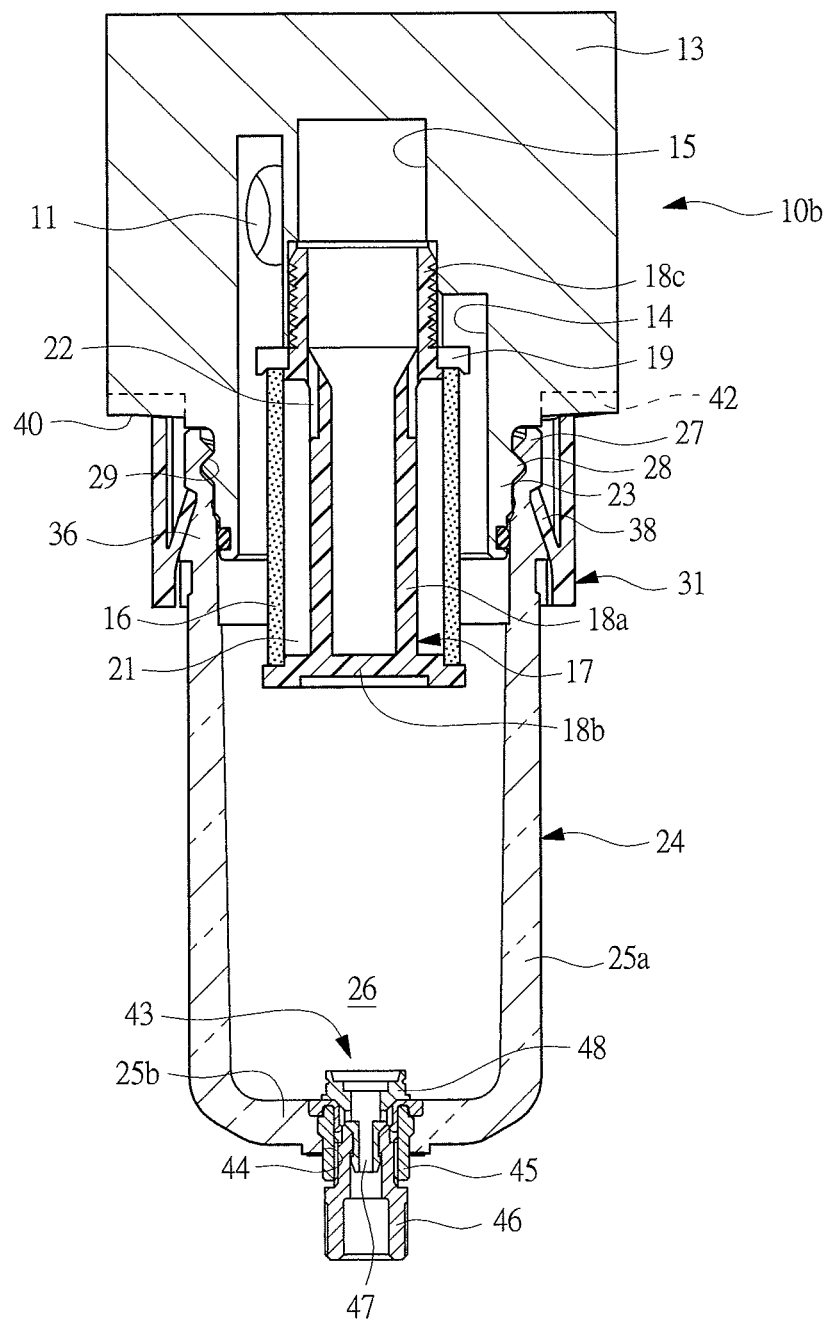
FIG. 6 is a cross-sectional view showing a filter according to another embodiment of the present invention.

FIG. 6 is a cross-sectional view showing a filter 10b according to another embodiment of the present invention, and this filter 10b is provided with a drain discharge mechanism. A drain discharge mechanism 43 shown in FIG. 6 is of a manual type, and has a guide cylinder 45 mounted in a mounting hole 44 formed in the bottom wall part 25b of the collecting vessel 24. A male screw of a drain cock 46 having a cylindrical shape is screwed to a female screw formed in this guide cylinder 45, and the drain cock 46 moves in the axial direction when the drain cock 46 is rotated. A valve element 48 in which a discharge hole 47 is formed is attached to the drain cock 46. Therefore, when the valve element 48 is opened by rotating the drain cock 46, fluid in the collecting vessel 24 is discharged to the outside. The filter 10b shown in FIG. 6 has the same structure as that of the filter 10a mentioned above except that the drain cock is provided in the collecting vessel 24.

Note that, although the drain cock 46 shown in FIG. 6 is of a manual type, if an automatic drain which is configured to automatically discharge the fluid to the outside when a fluid level is increased is incorporated in the collecting vessel, the filter will be a filter of an automatic drain type. Alternatively, if a drain of a semi-automatic drain type in which a discharge port is automatically released when the air supply to the reservoir 26 in the collecting vessel 24 is stopped is incorporated in the collecting vessel, the filter will be a filter of a semi-automatic drain type.

Figure 7:
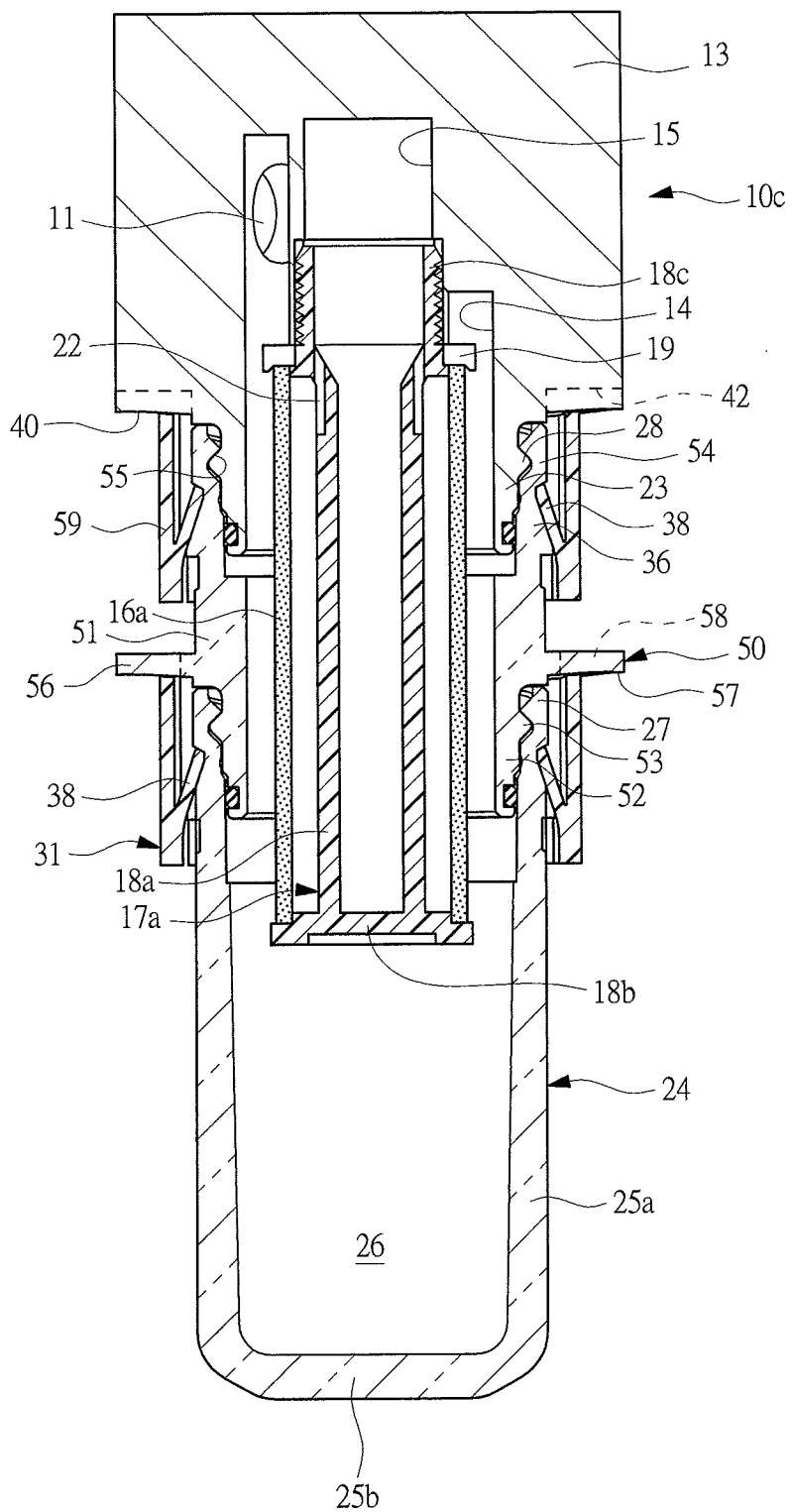
FIG. 7 is a cross-sectional view showing a filter according to another embodiment of the present invention.

FIG. 7 is a cross-sectional view showing a filter 10c according to another embodiment of the present invention, and this filter 10c is provided with an adapter 50. This filter 10c has the port block 13 and the collecting vessel 24 which are the same as those of the filter 10a shown in FIGS. 1A to 5. A filter element 16a attached to the port block 13 has a size longer than the filter element 16 mentioned above, and a holder 17a also has a longer size. In order to incorporate the long filter element 16a in the filter 10c, the adapter 50 is mounted between the collecting vessel 24 and the port block 13. Thus, it is possible to assemble the large size filter 10c by using the collecting vessel 24 and the port block 13 each having the same size as the collecting vessel 24 and the port block 13 of the filter 10a.

The adapter 50 has a cylinder body 51, and an additional male screw part 52 is formed in a lower end part of this cylinder body 51 in an axial direction in FIG. 7. A screw thread 53 provided in this additional male screw part 52 is the double thread screw of the right-handed screw which is the same as the screw thread 28 of the male screw part 23 provided in the port block 13. Thus, as shown in FIG. 7, the female screw part 27 of the collecting vessel 24 can be screwed to the additional male screw part 52 of the adapter 50. An additional female screw part 54 is formed in an upper end part of the cylinder body 51 in the axial direction. A thread groove 55 provided in this additional female screw part 54 is the thread groove of the double thread screw of the right-handed screw which is the same as the thread groove 29 of the female screw part 27 provided in the collecting vessel 24. Thus, the cylinder body 51 of the adapter 50 can be screwed to the male screw part 23 of the port block 13.

A flange 56 is provided in the cylinder body 51, and the end surface of the annular lock member 31 abuts on an end surface 57 of this flange 56. On the flange 56, a concave fixed-side engagement part 58 is formed so as to correspond to the movable-side engagement part 41 of the annular lock member 31. Therefore, the movable-side engagement part 41 of the annular lock member 31 mounted on the collecting vessel 24 engages with the flange 56, and the collecting vessel 24 is locked by the annular lock member 31.

On an outer circumferential surface of the cylinder body 51, two guide parts 32 and two inclined protrusions 36 are provided like the outer circumferential surface of the opening part of the collecting vessel 24. An additional annular lock member 59 is mounted on the cylinder body 51 so as to be movable in the axial direction of the adapter 50. This additional annular lock member 59 has the same shape as the annular lock member 31 mounted on the collecting vessel 24. Therefore, in the additional annular lock member 59, the concave guide parts 33 into which the convex guide parts 32 provided in the adapter 50 enter are provided, and also the tongue pieces 38 to be in contact with the inclined surfaces 37 of the inclined protrusions 36 are provided.

As shown in FIG. 7, by adding the adapter 50 on which the additional annular lock member 59 having the same shape as the annular lock member 31 mounted on the collecting vessel 24 is mounted to the filter 10a shown in FIGS. 1A to 5, the filter 10c having a long size can be assembled by utilizing the port block 13 and the collecting vessel 24 constituting the filter 10a as they are.

When the adapter 50 shown in FIG. 7 is incorporated in the filter 10b shown in FIG. 6, a filter having a long size provided with a drain cock can be acquired. The type of the drain of the filter having a long size includes the automatic drain type and the semi-automatic drain type as mentioned above.

Figure 8:
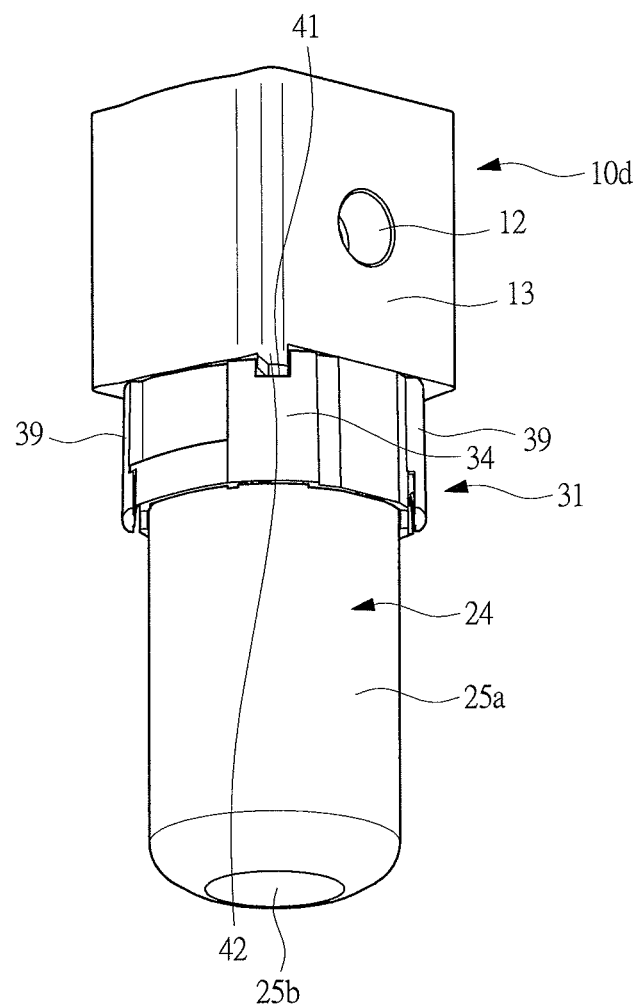
FIG. 8 is a perspective view showing a filter according to another embodiment of the present invention.
Figure 9:
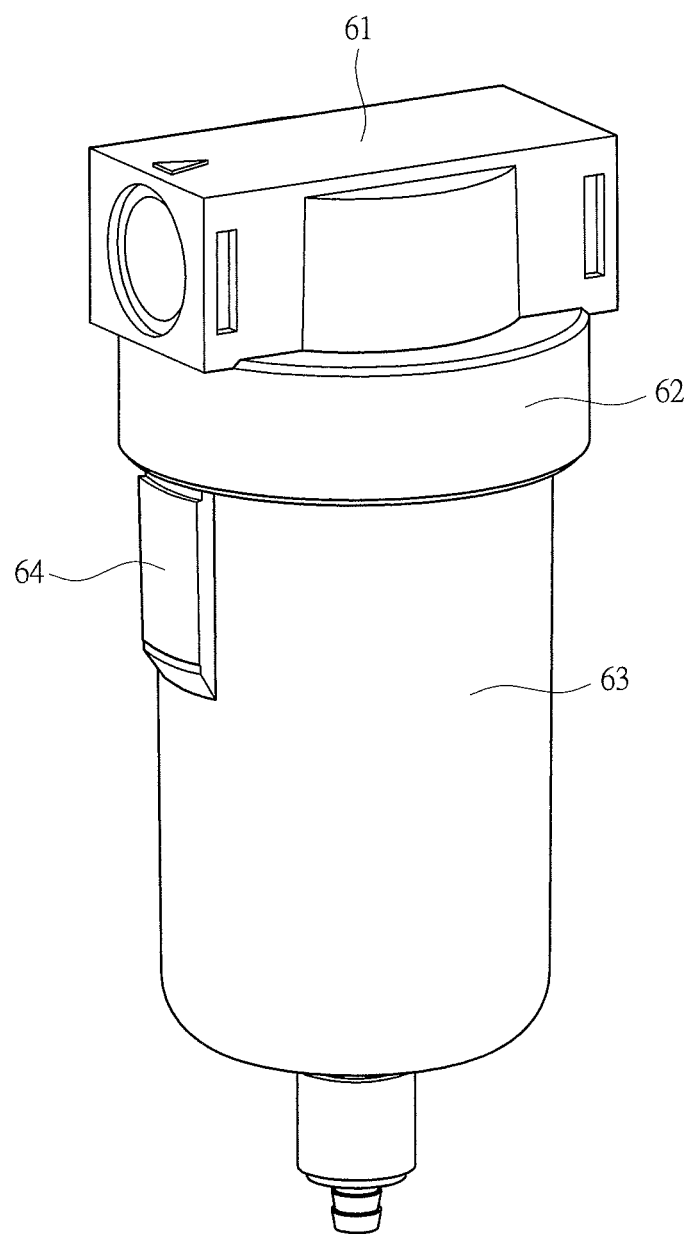
FIG. 9 is a perspective view showing a conventional filter.

FIG. 8 is a perspective view showing a filter 10d according to another embodiment of the present invention. On the port block 13 of this filter 10d, a protruding part is provided, and this protruding part functions as the fixed-side engagement part 42. On the other hand, the movable-side engagement part 41 with which the fixed-side engagement part 42 made up of the protruding part engages is formed on the annular lock member 31. The movable-side engagement part 41 provided in the annular lock member 31 shown in FIGS. 1A to 7 is a protruding part, and the movable-side engagement part 41 engages with the fixed-side engagement part 42 made up of a recessed part formed in the port block 13. Therefore, a concave/convex relationship is reversed in the filter 10d shown in FIG. 8.

The present invention is not limited to the foregoing embodiments and various modifications and alterations can be made within the scope of the present invention. For example, although a filter to which the present invention is applied is shown as an embodiment, the present invention may be applied to a lubricator. In that case, a lubricant contained in advance in the collecting vessel 24 is supplied in the form of a mist to the air to be supplied to a primary-side port, and flows out of a secondary-side port.

INDUSTRIAL APPLICABILITY

This vessel attaching/removing device is provided in a pneumatic circuit for supplying compressed air to a pneumatic equipment, and a conditioning apparatus such as a filter and a lubricator is mounted on the vessel attaching/removing device.

What is claimed is:

1. A vessel attaching/removing device for a conditioning apparatus, comprising:
   a port block in which a primary-side port to which compressed air is supplied and a secondary-side port which discharges compressed air are formed;
   a vessel having a cylindrical shape in which a female screw part to be screwed to a male screw part provided in the port block is provided inside an opening end part of the vessel;
   an annular lock member mounted outside the opening end part of the vessel so as to be movable in an axial direction of the vessel;
   a biasing member which is provided inside the annular lock member and presses the annular lock member in the axial direction toward the port block; and
   a movable-side engagement part which is provided on the annular lock member and engages with a fixed-side engagement part of the port block side when the vessel is rotated to a fastening completion position between the female screw part and the male screw part.

2. The vessel attaching/removing device for a conditioning apparatus according to claim 1, wherein
   the movable-side engagement part is formed from a protruding part which protrudes in an axial direction from an end surface of the annular lock member, and the fixed-side engagement part with which the movable-side engagement part engages is formed in the port block.

3. The vessel attaching/removing device for a conditioning apparatus according to claim 1, wherein
   the movable-side engagement part is formed from a recessed part which is cut out from an end surface of the annular lock member in the axial direction, and the fixed-side engagement part with which the movable-side engagement part engages is formed in the port block.

4. The vessel attaching/removing device for a conditioning apparatus according to claim 2, wherein
   two said movable-side engagement parts are provided on the annular lock member so as to be shifted by 180 degrees in a circumferential direction, and the fixed-side engagement parts with which the movable-side engagement parts engage are formed in the port block.

5. The vessel attaching/removing device for a conditioning apparatus according to claim 3, wherein
two said movable-side engagement parts are provided on the annular lock member so as to be shifted by 180 degrees in a circumferential direction, and the fixed-side engagement parts with which the movable-side engagement parts engage are formed in the port block.

6. The vessel attaching/removing device for a conditioning apparatus according to claim 1, wherein
the biasing member is made up of: a tongue piece which elastically deforms so that an inclined tip provided on an inner circumferential surface of the annular lock member so as to be inclined in a radially inward direction toward the port block is displaced in a radial direction; and an inclined surface which is provided on an outer circumferential surface of the vessel so as to be inclined in a radially outward direction toward a bottom part of the vessel and with which the tongue piece is to be in contact.

7. The vessel attaching/removing device for a conditioning apparatus according to claim 1, wherein
the male screw part and the female screw part are multiple thread screws.

8. The vessel attaching/removing device for a conditioning apparatus according to claim 1, wherein
a filter element to remove foreign objects such as droplets contained in the air flowing from the primary-side port to the secondary-side port is mounted on the port block, thereby purifying the air which flows out of the secondary-side port.

9. The vessel attaching/removing device for a conditioning apparatus according to claim 1, further comprising an adaptor, the adapter including:
a cylinder body in which an additional female screw part to be screwed to the male screw part is provided on one end part and an additional male screw part to which the female screw part is screwed is provided on the other end part;
an additional annular lock member which is mounted outside one end part of the cylinder body so as to be movable in an axial direction;
an additional biasing member which is provided inside the additional annular lock member and presses the additional annular lock member in an axis direction of the cylinder body; and
a fixed-side engagement part which is formed on a flange provided in the cylinder body, and with which the movable-side engagement part engages, wherein
the vessel is connected to the port block by the adapter.

* * * * *